United States Patent
Ishida et al.

(10) Patent No.: US 10,622,135 B2
(45) Date of Patent: *Apr. 14, 2020

(54) ELECTRONIC COMPONENT

(71) Applicant: Murata Manufacturing Co., Ltd., Kyoto (JP)

(72) Inventors: Kosuke Ishida, Nagaokakyo (JP); Hiromu Fukushima, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 414 days.

This patent is subject to a terminal disclaimer.

(21) Appl. No.: 15/683,095

(22) Filed: Aug. 22, 2017

(65) Prior Publication Data
US 2018/0090260 A1 Mar. 29, 2018

(30) Foreign Application Priority Data

Sep. 26, 2016 (JP) .................. 2016-187201

(51) Int. Cl.
*H02H 9/00* (2006.01)
*H01F 27/28* (2006.01)
(Continued)

(52) U.S. Cl.
CPC ......... *H01F 27/2804* (2013.01); *H01F 27/29* (2013.01); *H01F 27/323* (2013.01);
(Continued)

(58) Field of Classification Search
None
See application file for complete search history.

(56) References Cited

U.S. PATENT DOCUMENTS 6,476,690 B1 * 11/2002 Nakata ................ H01F 17/0013
333/184
6,696,911 B2 * 2/2004 Tomohiro ........... H01F 17/0013
336/200

FOREIGN PATENT DOCUMENTS

CN 101859637 A 10/2010
JP H09-36174 A 2/1997
(Continued)

OTHER PUBLICATIONS

An Office Action; "Notification of Reasons for Refusal," mailed by the Japanese Patent Office dated Mar. 5, 2019, which corresponds to Japanese Patent Application No. 2016-187201 and is related to U.S. Appl. No. 15/683,095; with English language translation.
(Continued)

*Primary Examiner* — Stephen W Jackson
(74) *Attorney, Agent, or Firm* — Studebaker & Brackett PC

(57) ABSTRACT

An electronic component having a laminated body made up of a plurality of laminated insulator layers and having an upper surface and a bottom surface. A plurality of inner conductors is disposed on the insulator layers in the laminated body. A plurality of terminal electrodes is electrically connected to the plurality of inner conductors. The plurality of terminal electrodes each is exposed on a bottom surface side of the laminated body. Some or all of the plurality of terminal electrodes constitute a terminal electrode unit. The terminal electrode unit includes a first terminal electrode and a plurality of second terminal electrodes arranged around the first terminal electrode at substantially the same intervals from the first terminal electrode.

14 Claims, 17 Drawing Sheets

(51) Int. Cl.
*H01F 27/29* (2006.01)
*H01F 27/32* (2006.01)
*H01G 4/30* (2006.01)
*H01G 4/228* (2006.01)
*H01G 4/005* (2006.01)
*H01G 4/012* (2006.01)
*H01G 4/232* (2006.01)
*H01G 4/40* (2006.01)

(52) U.S. Cl.
CPC ............ *H01G 4/005* (2013.01); *H01G 4/012* (2013.01); *H01G 4/228* (2013.01); *H01G 4/232* (2013.01); *H01G 4/30* (2013.01); *H01G 4/40* (2013.01); *H01F 2027/2809* (2013.01)

(56) References Cited

FOREIGN PATENT DOCUMENTS

| | | |
|---|---|---|
| JP | 2004-297456 A | 10/2004 |
| JP | 2005-073096 A | 3/2005 |
| JP | 2006-237080 A | 9/2006 |
| JP | 2010-541358 A | 12/2010 |
| WO | 2012/144229 A1 | 10/2012 |
| WO | 2012/144360 A1 | 10/2012 |

OTHER PUBLICATIONS

An Office Action mailed by the Chinese Patent Office dated May 8, 2019, which corresponds to Chinese Patent Application No. 201710550480.2 and is related to U.S. Appl. No. 15/683,095 with English language translation.

\* cited by examiner

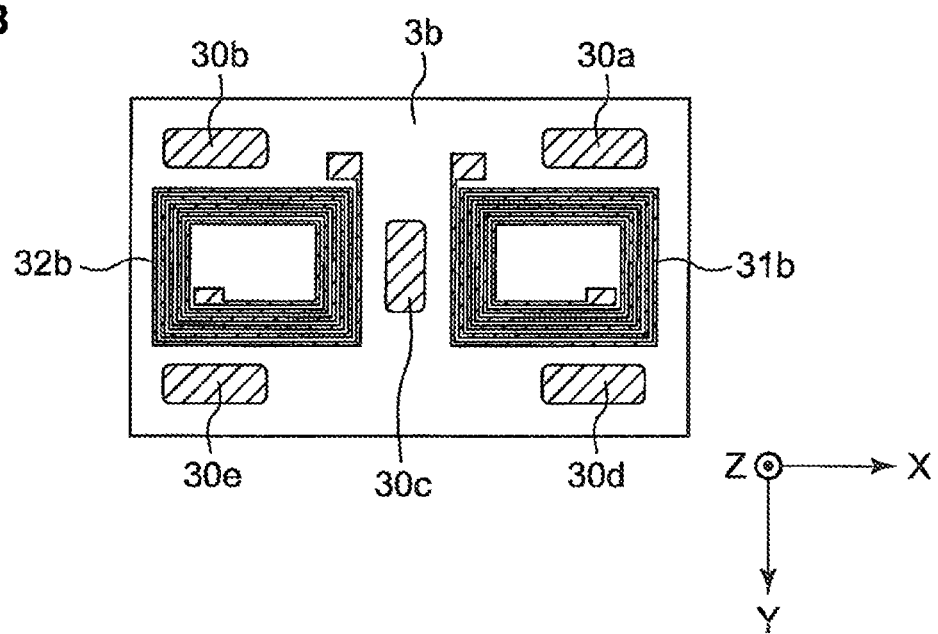

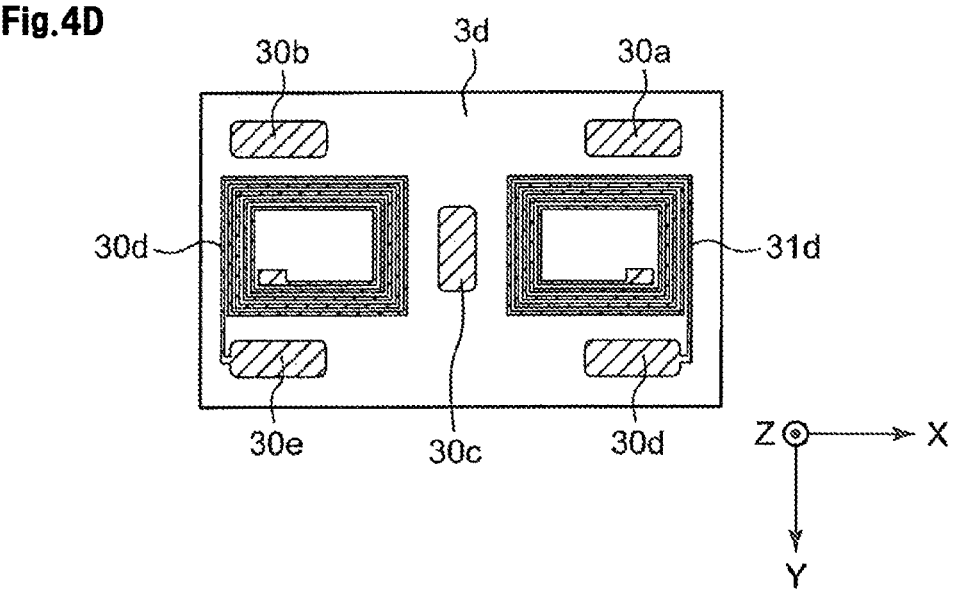

ELECTRONIC COMPONENT

CROSS REFERENCE TO RELATED APPLICATIONS

This application claims benefit of priority to Japanese Patent Application 2016-187201 filed Sep. 26, 2016, the entire content of which is incorporated herein by reference.

TECHNICAL FIELD

The present disclosure relates to an electronic component, and more particularly, to an electronic component having a laminated structure.

BACKGROUND

For example, a common mode choke coil described in Japanese Laid-open Patent Publication No. 2006-237080 is known as an electronic component having a laminated structure. FIG. 11 is a schematic perspective view of the structure of the common mode choke coil. The common mode choke coil includes a rectangular parallelepiped laminated body 100 made up of a plurality of laminated insulators, three coils (not shown) located in the laminated body 100 and magnetically coupled to each other, and six terminal electrodes 101 to 106 formed on side surfaces of the laminated body 100 and electrically connected to the end portions of the respective coils. FIG. 12 is a bottom view of the laminated body 100, and the six terminal electrodes 101 to 106 are each exposed on the bottom surface. For the three terminal electrodes formed on substantially the same side surface, a pair of signal terminal electrodes (e.g., 101, 103) is arranged with one ground terminal electrode (e.g., 102) interposed therebetween. This common mode choke coil is solder-bonded to a mounting land of a circuit board so as to form a solder fillet and is mounted on the circuit board.

On the other hand, in association with recent miniaturization of electronic devices, the demand for miniaturization has been created also for an electronic component having a laminated structure (hereinafter also referred to as a laminated electronic component) mounted on a circuit board.

SUMMARY

Problem to be Solved by the Disclosure

It is therefore an object of the present disclosure to provide an electronic component capable of achieving miniaturization.

Solutions to the Problem

To solve the problem, an aspect of this discloser provides an electronic component comprising:
a laminated body made up of a plurality of laminated insulator layers and having an upper surface and a bottom surface;
a plurality of inner conductors disposed on the insulator layers in the laminated body; and
a plurality of terminal electrodes electrically connected to the plurality of inner conductors,
the plurality of terminal electrodes each being exposed on a bottom surface side of the laminated body,
some or all of the plurality of terminal electrodes constituting a first terminal electrode unit,
the first terminal electrode unit including a first terminal electrode and a plurality of second terminal electrodes arranged around the first terminal electrode at substantially the same intervals from the first terminal electrode.

According to the aspect, the electronic component can be miniaturized.

According to another aspect, out of the plurality of terminal electrodes, some or all of the remaining terminal electrodes not constituting the first terminal electrode unit constitute a second terminal electrode unit, and the second terminal electrode unit includes a third terminal electrode and a plurality of fourth terminal electrodes arranged around the third terminal electrode at substantially the same intervals from the third terminal electrode.

According to the aspect, a plurality of elements is easily combined while achieving miniaturization.

According to another aspect, in a planar view of the bottom surface, the first terminal electrode and the plurality of second terminal electrodes each have a polygonal shape, and each of the plurality of second terminal electrodes and the first terminal electrode have sides facing each other and are disposed such that positions minimizing an interval therebetween are located on the facing sides.

According to the aspect, the electronic component can further be miniaturized while ensuring the area of the terminal electrode and the intervals between the terminal electrodes.

According to another aspect, in a planar view of the bottom surface, the first terminal electrode and the plurality of second terminal electrodes each have a polygonal shape, and at least one corner portion has a round shape among corner portions of the first terminal electrode facing the second terminal electrodes and corner portions of the second terminal electrodes facing the first terminal electrode.

According to the aspect, the electronic component can further be miniaturized while ensuring the area of the terminal electrode and the intervals between the terminal electrodes, and the terminals can be made harder to peel.

According to another aspect, a plurality of recesses is formed on the bottom surface of the laminated body, and the terminal electrodes are formed on wall surfaces of the plurality of recesses.

According to the aspect, a positional shift and a tilt of the electric component can be suppressed at the time of mounting.

According to another aspect, out of the plurality of terminal electrodes, some or all of the remaining terminal electrodes not constituting the first terminal electrode unit constitute a second terminal electrode unit, and the second terminal electrode unit includes a third terminal electrode and a plurality of fourth terminal electrodes arranged around the third terminal electrode at substantially the same intervals from the third terminal electrode.

According to the aspect, a plurality of elements is easily combined while achieving miniaturization.

According to another aspect, the plurality of inner conductors constitutes at least two or more elements selected from the group consisting of a coil, a capacitor, and a resistor.

According to the aspect, a plurality of elements is easily combined while achieving miniaturization.

According to another aspect, the first terminal electrode is a ground terminal electrode.

According to the aspect, unification into one ground terminal electrode enables provision of the composite electronic component capable of achieving miniaturization.

According to another aspect, the plurality of second terminal electrodes is arranged at four corners of the bottom surface of the laminated body.

According to the aspect, the miniaturization can further be achieved.

According to another aspect, the first terminal electrode is disposed at the center of the bottom surface of the laminated body.

According to the aspect, the miniaturization can further be achieved.

According to another aspect, the first terminal electrode is a ground terminal electrode, and the second terminal electrodes are signal terminal electrodes.

According to the aspect, unification into one ground terminal electrode enables provision of the electronic component capable of achieving miniaturization.

According to another aspect, the plurality of inner conductors includes a coil conductor wound on the insulator layers and a capacitor conductor disposed in a plate shape on the insulator layers, and the signal terminal electrodes are connected to the coil conductor while the ground terminal electrode is connected to the capacitor conductor.

According to the aspect, a plurality of elements is easily combined while achieving miniaturization.

According to another aspect, the second terminal electrodes arranged at the four corners are formed on wall surfaces of cutout portions formed at the four corners of the bottom surface of the laminated body.

According to the aspect, an exclusive area of an internal circuit can be increased while achieving miniaturization.

According to another aspect, the plurality of terminal electrodes are exposed only on the bottom surface of the laminated body.

According to the aspect, since a solder fillet can further be restrained from being formed on the outside of an electronic component main body at the time of mounting, the mounting space can be narrowed.

Effect of the Disclosure

According to the present disclosure, the electronic component capable of achieving miniaturization can be provided.

BRIEF DESCRIPTION OF THE DRAWINGS

FIG. 4B is a plane view of a second coil conductor of the first coil element and the second coil element in the laminated body shown in FIG. 1.

FIG. 4D is a plane view of a fourth coil conductor of the first coil element and the second coil element in the laminated body shown in FIG. 1.

DETAILED DESCRIPTION

An embodiment of an electronic component according to an aspect of the present disclosure will now be described with reference to the drawings.

First Embodiment

An electronic component of a first embodiment includes a laminated body made up of a plurality of laminated insulator layers and having an upper surface and a bottom surface, a plurality of inner conductors disposed on the insulator layers in the laminated body, and a plurality of terminal electrodes electrically connected to the plurality of inner conductors, the plurality of terminal electrodes each being exposed on a bottom surface side of the laminated body, some or all of the plurality of terminal electrodes constituting a first terminal electrode unit, the first terminal electrode unit including a first terminal electrode and a plurality of second terminal electrodes arranged around the first terminal electrode at substantially the same intervals from the first terminal electrode.

Figure 1:
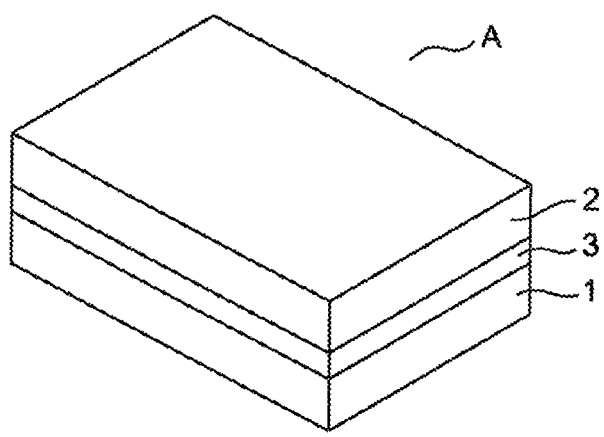
FIG. 1 is a schematic perspective view of an example of a structure of a laminated body constituting an electronic component according to an embodiment.

FIG. 1 is a schematic perspective view of an example of a structure of an electronic component according to this embodiment. The electronic component is made up of a laminated body A including an insulator layer 1, an insulator layer 3, and an insulator layer 2. The laminated body A has an upper surface and a bottom surface and has a rectangular parallelepiped shape in this example.

Figure 2:
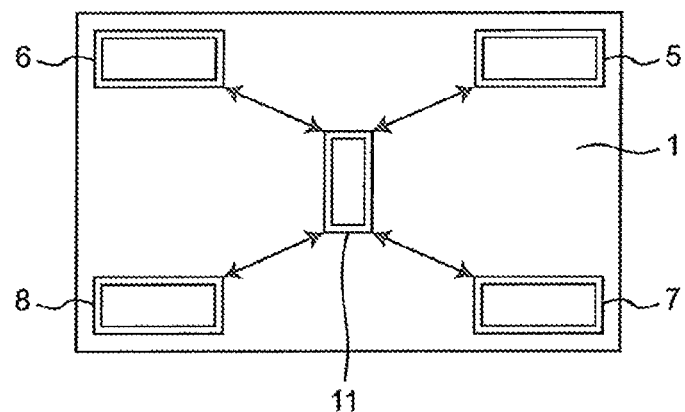
FIG. 2 is a bottom view of the laminated body shown in FIG. 1.

FIG. 2 is a bottom view of the laminated body A. A plurality of terminal electrodes 5, 6, 7, 8, 11 is formed on a bottom surface of the laminated body A. In an example described in this embodiment, a plurality of recesses is formed on the bottom surface of the laminated body A to use layered terminal electrodes formed on wall surfaces of the plurality of recesses.

The plurality of the terminal electrodes 5, 6, 7, 8, 11 constitute one first terminal electrode unit, and the first terminal electrode unit has the first terminal electrode 11 disposed at the center and the four second terminal electrodes 5, 6, 7, 8 disposed around the first terminal electrode 11. The first terminal electrode 11 and the four second terminal electrodes 5, 6, 7, 8 have substantially the same intervals indicated by arrows in FIG. 2. In this case, when the first terminal electrode and the second terminal electrodes are formed on the bottom surface of the laminated body, the interval between the first terminal electrode and each of the second terminal electrodes means a minimum distance between arbitrary points, between sides, or between a point and a side on the contour lines of the first terminal electrode and the second terminal electrode in a planar view of the bottom surface of the laminated body. In this case, the points include corners. In FIG. 2, openings of the recesses have a rectangular shape in a planar view, and the minimum distances between the first terminal electrode 11 and the second terminal electrodes 5, 6, 7, 8 are given as distances between closest corners, and the distances are substantially the same.

Figure 3:
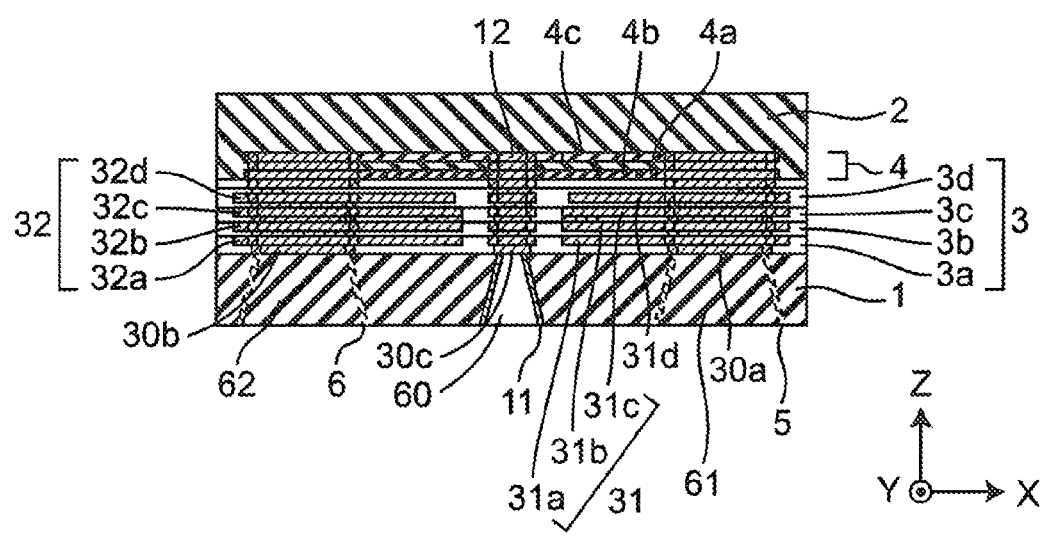
FIG. 3 is a schematic longitudinal sectional view of FIG. 1.
Figure 4A:
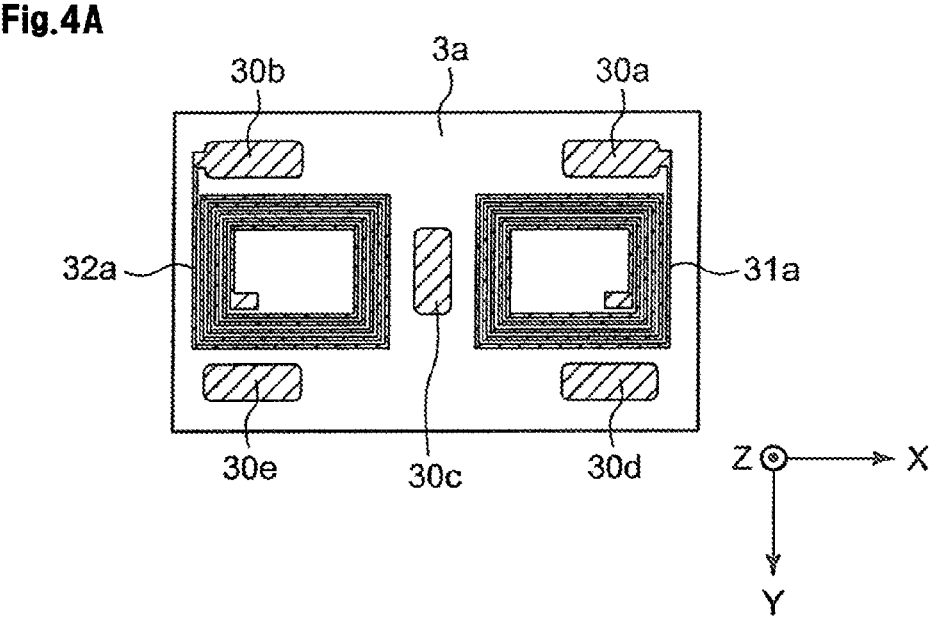
FIG. 4A is a plane view of a first coil conductor of a first coil element and a second coil element in the laminated body shown in FIG. 1.
Figure 4C:
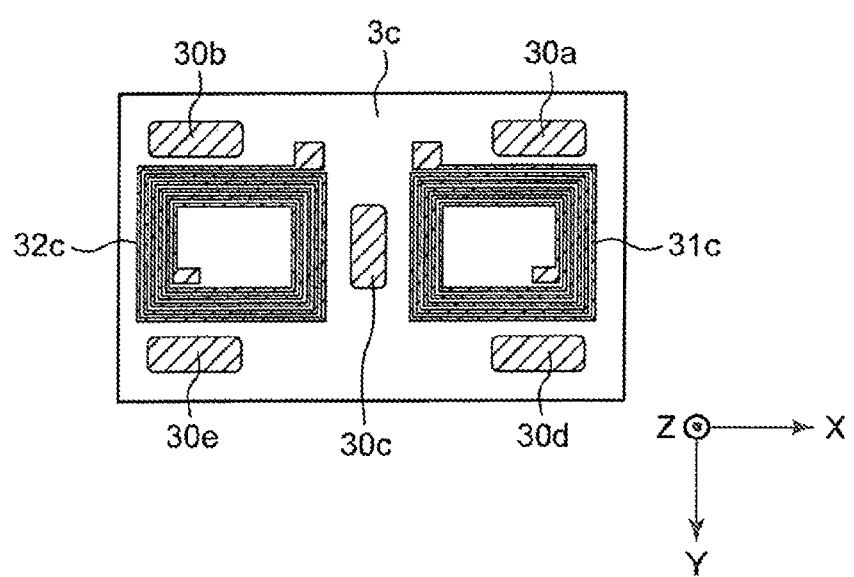
FIG. 4C is a plane view of a third coil conductor of the first coil element and the second coil element in the laminated body shown in FIG. 1.
Figure 5A:
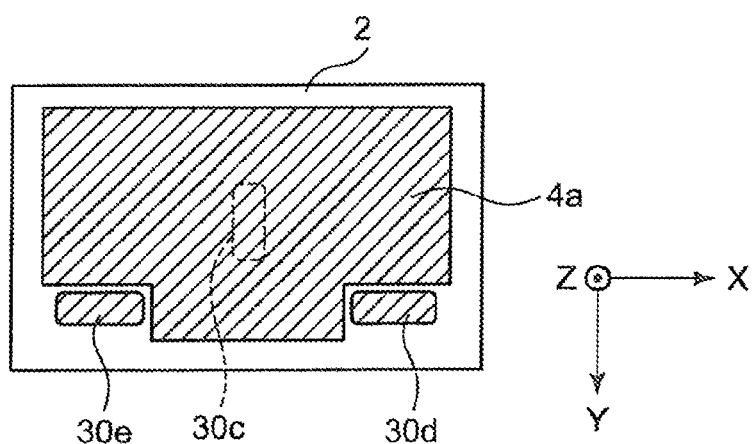
FIG. 5A is a plane view of a first electrode plate of a capacitor element in the laminated body shown in FIG. 1.
Figure 5B:
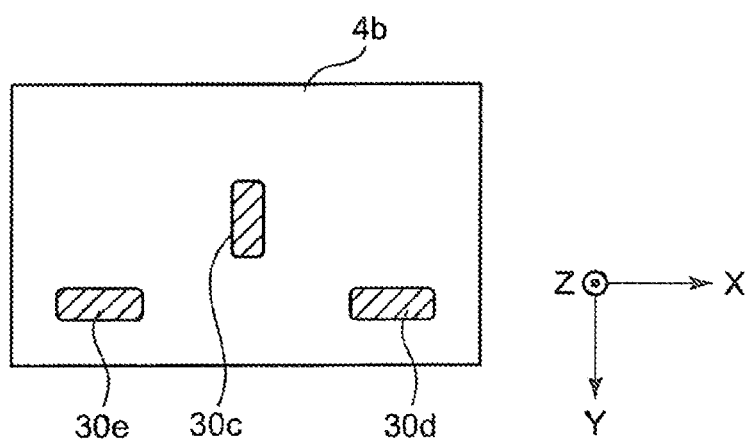
FIG. 5B is a plane view between the first electrode plate and a second electrode plate of the capacitor element in the laminated body shown in FIG. 1.
Figure 5C:
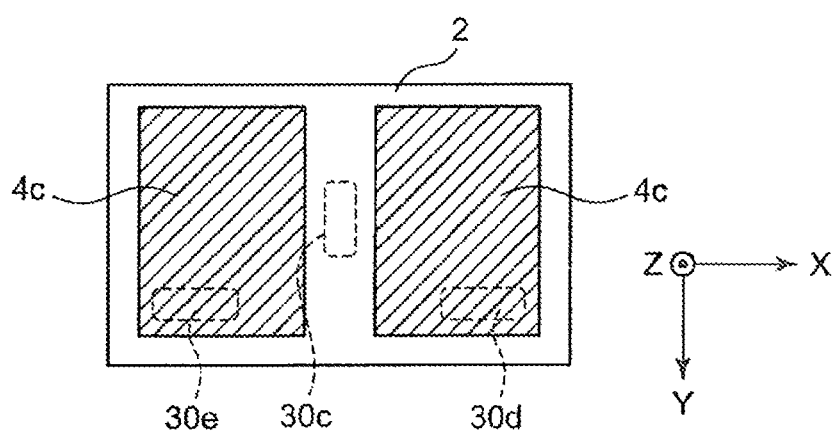
FIG. 5C is a plane view of the second electrode plate of the capacitor element in the laminated body shown in FIG. 1.

The structure of the laminated body A will be described in more detail with reference to FIG. 3. FIG. 3 is a schematic longitudinal sectional view of the laminated body A. The insulator layer 3 is disposed between the insulator layer 1 and the insulator layer 2. On the lower layer side of the insulator layer 2, a capacitor element 4 described later including a dielectric layer is buried. In the insulator layer 1 on the bottom surface side of the laminated body A, the ground terminal electrode 11 and the signal terminal electrodes 5, 6 are formed. The insulator layer 3 includes a plurality of insulator layers 3a, 3b, 3c, 3d. In this embodiment, a first coil element 31 and a second coil element 32 are disposed in a region in which the insulator layer 3 is formed. The capacitor element 4 has a structure in which a first electrode plate 4a and a second electrode plate 4c disposed in the insulator layer 2 face each other across a dielectric layer 4b, and the dielectric layer 4b is a portion of the insulator layer 2.

As shown in FIGS. 3 and 4A to 4D, the first coil element 31 includes a first coil conductor 31a, a second coil conductor 31b, a third coil conductor 31c, and a fourth coil conductor 31d laminated in order from a lower layer to an upper layer. The first to fourth coil conductors 31a, 31b, 31c, 31d are inner conductors wound and arranged on the insulator layers 3a, 3b, 3c, 3d constituting the insulator layer 3.

An outer circumferential end of the first coil conductor 31a is connected to a signal electrode 30a. The first coil conductor 31a is wound clockwise from the outer circumferential end to an inner circumferential end. The inner circumferential end of the first coil conductor 31a is connected through a via conductor to an inner circumferential end of the second coil conductor 31b. The second coil conductor 31b is wound clockwise from the inner circumferential end to an outer circumferential end. The outer circumferential end of the second coil conductor 31b is connected through a via conductor to an outer circumferential end of the third coil conductor 31c. The third coil conductor 31c is wound clockwise from the outer circumferential end to an inner circumferential end. The inner circumferential end of the third coil conductor 31c is connected through a via conductor to an inner circumferential end of the fourth coil conductor 31d. The fourth coil conductor 31d is wound clockwise from the inner circumferential end to an outer circumferential end. The outer circumferential end of the fourth coil conductor 31d is connected to a signal electrode 30d.

The second coil element 32 includes a first coil conductor 32a, a second coil conductor 32b, a third coil conductor 32c, and a fourth coil conductor 32d laminated in order from a lower layer to an upper layer. The first to fourth coil conductors 32a, 32b, 32c, 32d are inner conductors wound and arranged on the insulator layers 3a, 3b, 3c, 3d constituting the insulator layer 3.

An outer circumferential end of the first coil conductor 32a is connected to a signal electrode 30b. The first coil conductor 32a is wound counterclockwise from the outer circumferential end to an inner circumferential end. The inner circumferential end of the first coil conductor 32a is connected through a via conductor to an inner circumferential end of the second coil conductor 32b. The second coil conductor 32b is wound counterclockwise from the inner circumferential end to an outer circumferential end. The outer circumferential end of the second coil conductor 32b is connected through a via conductor to an outer circumferential end of the third coil conductor 32c. The third coil conductor 32c is wound counterclockwise from the outer circumferential end to an inner circumferential end. The inner circumferential end of the third coil conductor 32c is connected through a via conductor to an inner circumferential end of the fourth coil conductor 32d. The fourth coil conductor 32d is wound counterclockwise from the inner circumferential end to an outer circumferential end. The outer circumferential end of the fourth coil conductor 32d is connected to a signal electrode 30e.

The first coil conductor 31a, the second coil conductor 31b, the third coil conductor 31c, and the fourth coil conductor 31d of the first coil element 31 are concentrically arranged. The first coil conductor 32a, the second coil conductor 32b, the third coil conductor 32c, and the fourth coil conductor 32d of the second coil element 32 are concentrically arranged. The axis of the first coil element 31 and the axis of the second coil element 32 are orthogonal to the bottom surface of the laminated body A. The axis of the first coil element 31 and the axis of the second coil element 32 are arranged in parallel.

As shown in FIGS. 3 and 5A to 5C, the capacitor element 4 includes the first electrode plate 4a and the second electrode plate 4c that are inner conductors laminated in order from a lower layer to an upper layer via the dielectric layer 4b. The dielectric layer 4b is a portion of the insulator layer 2. The second electrode plate 4c is in the form of two plates respectively connected to the signal electrode 30d and the signal electrode 30e. The first electrode plate 4a is connected to a signal electrode 30c.

The signal electrodes 30a, 30b, 30c, 30d, 30e are each extended in the lamination direction and disposed in the insulator layers 2, 3. When viewed in the Z direction, the signal electrode 30a is overlapped with the signal terminal electrode 5 and connected to the signal terminal electrode 5. The signal electrode 30b is overlapped with the signal terminal electrode 6 and connected to the signal terminal electrode 6. The signal electrode 30c is overlapped with the ground terminal electrode 11 and connected to the ground terminal electrode 11. The signal electrode 30d is overlapped with the signal terminal electrode 7 and connected to the signal terminal electrode 7. The signal electrode 30e is overlapped with the signal terminal electrode 8 and connected to the signal terminal electrode 8.

The ground terminal electrode and the signal terminal electrodes are formed in the recesses formed on the bottom surface of the laminated body A. The recesses have a reverse taper cross-sectional shape spreading toward the opening side thereof.

A method of manufacturing the laminated body A will be described with reference to FIG. 3. A magnetic substrate, for example, a ferrite substrate is prepared as the insulator layer 1. The insulator layer 3a made of an insulating resin is formed on the ferrite substrate by a photolithography method. On the insulator layer 3a and the ferrite substrate exposed from the insulator layer 3a, a conductive metal film, for example, a metal film made of Ag, Cu, Au, or an alloy mainly composed thereof is formed by sputtering. Subsequently, a photoresist is formed on a portion in which an inner conductor serving as a coil conductor, a signal electrode, and an interlayer connecting conductor (via conductor) are formed. Etching is then performed to remove the conductive metal film except the portion in which the inner conductor, the signal electrode, and the interlayer connection conductor are formed (the portion covered with the photoresist). Subsequently, the photoresist is removed by an organic solvent to form the inner conductor, the signal electrode, and the interlayer connection conductor on the insulator layer 3a. This process is repeated to form the insulator layer 3 (the coil element) including the insulator layers 3b to 3d, the inner conductors, the signal electrodes, and the interlayer connection conductors.

Subsequently, the insulator layer 2 and the capacitor element 4 are formed on the insulator layer 3. Specifically, for example, a conductive metal film and an insulating resin are alternately formed on the insulator layer 3 and appropriately patterned to form the insulator layer 2 including the dielectric layer 4b, the first and second electrode plates 4a, 4c, and the signal electrodes 30c to 30d. A plurality of recesses is then formed in the insulator layer 1 by using a laser or by blasting. Conductive metal films are formed on the wall surfaces of the recesses to form the ground terminal electrode and the signal terminal electrodes. The conductive metal films can be formed not only by a sputtering method but also by a plating method or a printing method using a paste containing a conductive metal powder.

For the insulator layer 1, a magnetic substrate can be used. The magnetic substrate may be a ferrite substrate. Alternatively, the substrate can be acquired by firing a ceramics substrate of alumina etc. or a resin layer coated with a paste containing a ferrite calcined powder or a metal magnetic powder. The paste may be used as the insulator layer 1. For the insulator layers 2, 3, an insulating resin such as polyimide or a magnetic resin acquired by containing a magnetic powder in an insulating resin can be used.

Although the method of manufacturing the laminated body A has been described with the example of using a photolithography method, the method is not limited thereto and can be achieved by using a method in which a plurality of insulator green sheets having inner conductors formed on surfaces is laminated and integrated by firing. Although the formation of the wiring pattern has been described with the example of using a subtract method, an additive method is also usable.

In the electronic component according to this embodiment, each of the plurality of terminal electrodes is a constituent of the first terminal electrode unit exposed on the bottom surface side of the laminated body, and the four second terminal electrodes are arranged around the first terminal electrode to have substantially the same intervals on the bottom surface. Although a certain minimum interval or more must be ensured between the terminal electrodes depending on a board mounting technique (user's requirement), this configuration enables the minimum interval to be oriented in an oblique direction of the outer shape of the electronic component and therefore can reduce the outer shape of the electronic component as compared to when three terminal electrodes are arranged on one side so that one side of the outer shape of the electronic component is limited to twice or more of the minimum interval as in the conventional case.

Additionally, the plurality of terminal electrodes can be exposed only on the bottom surface of the laminated body. As a result, the solder fillet can be prevented from being formed on the outside of an electronic component main body at the time of mounting, so that a mounting space can be narrowed.

Regarding the terminal electrodes, FIG. 3 depicts an example in which the terminal electrodes are formed in the recesses of the insulator layer 1. In this case, since the solder enters the recesses at the time of mounting so that the solder fillet can further be restrained from being formed on the outside of the electronic component main body at the time of mounting, the mounting space can further be narrowed. Additionally, since the solder enters the recesses, the mounting height of the electronic component can be made lower. Since the bonding strength of the electronic component can also be increased at the time of mounting and the electronic component is more easily positioned at the time of mounting so that the occurrence of positional shift and tilt can be reduced, the reliability of the electronic component can be improved.

In this embodiment, the four second terminal electrodes are used as two pairs of signal terminal electrodes, and the first terminal electrode is used as a ground terminal electrode. In this embodiment, since one of the terminal electrodes exposed on the bottom surface is used as the ground terminal electrode, routing from the plurality of capacitor elements can be reduced, so that the outer shape of the electronic component can further be miniaturized.

Although the example of the inner conductors constituting a coil element and a capacitor element has been described in this embodiment, the inner conductors may constitute a resistor element. The electronic component according to this embodiment is applicable to a composite electronic component such as an LC composite electronic component, an LR composite electronic component, and an LCR composite electronic component.

Second Embodiment

Figure 6:
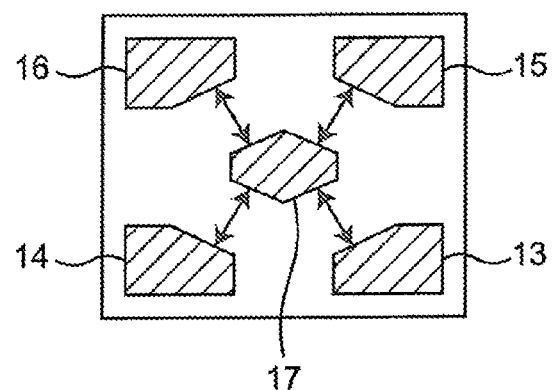
FIG. 6 is a bottom view of a structure of a laminated body according to another embodiment of the present disclosure.

This embodiment has the same configuration as the first embodiment except that, in the planar view of the bottom surface, each of the plurality of second terminal electrodes and the first terminal electrode have sides facing each other with positions minimizing an interval therebetween located on the facing sides. FIG. 6 shows an example in which a first terminal electrode 17 and four second terminal electrodes 13, 14, 15, 16 have a polygonal shape and have sides facing each other for each of the four second terminal electrodes 13, 14, 15, 16, and the first terminal electrode 17 is disposed such that the positions minimizing an interval therebetween are located on the facing sides.

According to this embodiment, since an interval between the centers of the terminal electrodes can be made smaller as compared to the first embodiment, or in other words, since the terminal electrodes can be brought closer to each other, the outer shape of the electronic component can further be miniaturized, or the terminal electrodes can be increased in area while maintaining the same outer shape.

Third Embodiment

Figure 7:
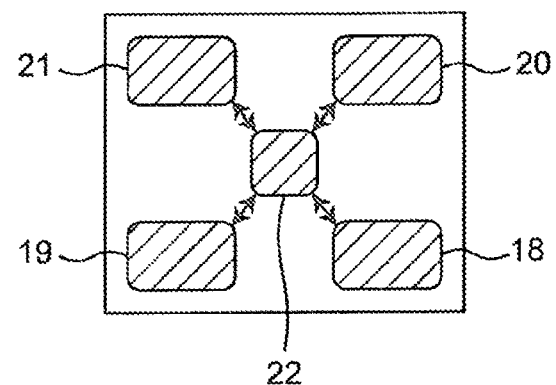
FIG. 7 is a bottom view of a structure of a laminated body according to another embodiment of the present disclosure.

This embodiment has the same configuration as the first embodiment except that at least one corner portion has a round shape among the corner portions of the first terminal electrode facing the second terminal electrodes and the corner portions of the second terminal electrodes facing the first terminal electrode. FIG. 7 shows an example in which the first terminal electrode 22 and the four second terminal electrodes 18, 19, 20, 21 have a polygonal shape and all the corner portions of the first terminal electrode 22 and the four second terminal electrodes 18, 19, 20, 21 have a round shape.

According to this embodiment, since an interval between the centers of the terminal electrodes can be made smaller as compared to the first embodiment, or in other words, since the terminal electrodes can be brought closer to each other, the outer shape of the electronic component can further be miniaturized, or the terminal electrodes can be increased in area while maintaining the same outer shape. Additionally, since stress can be distributed as compared to the case of the corner portions having a right-angle shape, the terminals can be made harder to peel.

Fourth Embodiment

Figure 8:
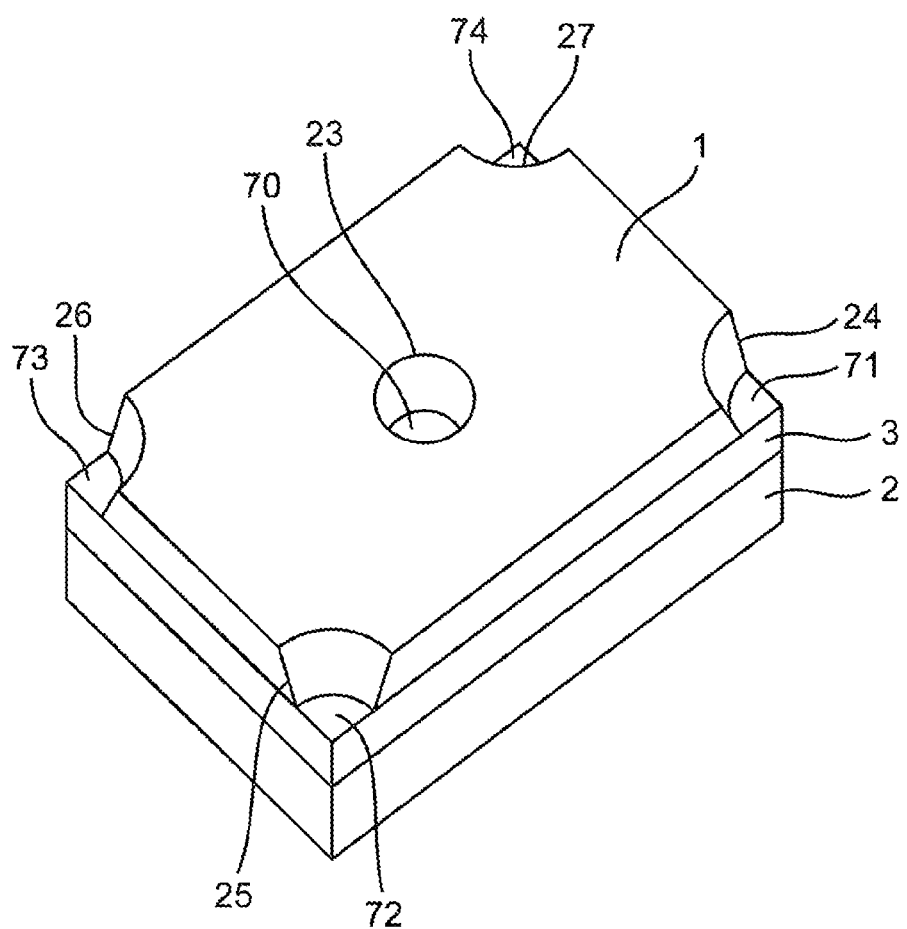
FIG. 8 is a bottom perspective view of a structure of a laminated body according to another embodiment of the present disclosure.

This embodiment has the same configuration as the first embodiment except that the four second terminal electrodes are formed on wall surfaces of cutout portions formed at four corners of the bottom surface of the laminated body. FIG. 8 shows an example in which one first terminal electrode 23 is formed in a recess 70 at the center of the bottom surface and four second terminal electrodes 24, 25, 26, 27 are formed in cutout portions 71, 72, 73, 74 at the four corners of the bottom surface.

This embodiment has the effect that an exclusive area of an internal circuit can be increased while achieving the miniaturization of the electronic component, in addition to the effects of the first embodiment.

Fifth Embodiment

Figure 9:
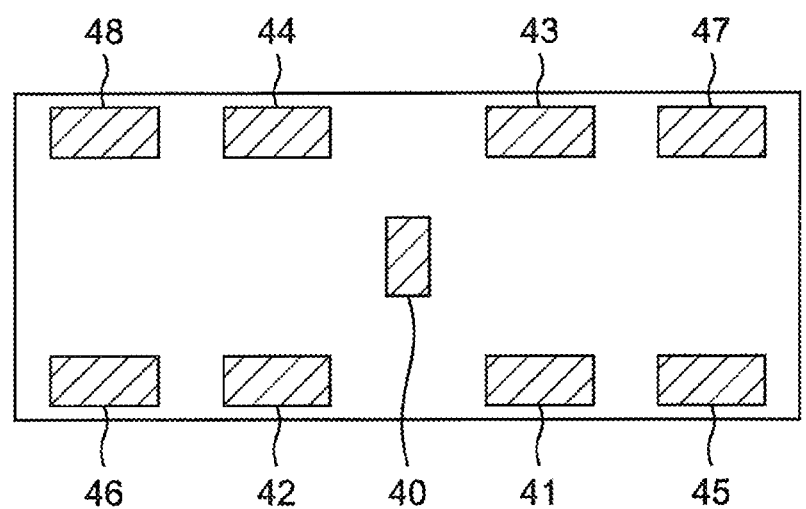
FIG. 9 is a bottom view of a structure of a laminated body according to another embodiment of the present disclosure.

Although the one first terminal electrode unit is included in the example described in the first embodiment, the number of elements capable of being incorporated can be increased by increasing the number of terminal electrodes. This embodiment is an example thereof, and the plurality of terminal electrodes further includes at least one third terminal electrode formed on the bottom surface of the laminated body in addition to the at least one first terminal electrode unit, and the interval between the third terminal electrode and the first terminal electrode is larger than the interval between the first terminal electrode and the second terminal electrodes. FIG. 9 is a bottom view of a laminated body showing an example thereof, showing an example in which one first terminal electrode unit and four third terminal electrodes are included. The first terminal electrode unit is made up of a first terminal electrode 40 and four second terminal electrodes 41, 42, 43, 44. A pair of third terminal electrodes 45, 47 and a pair of third terminal electrodes 46, 48 are respectively disposed on both sides of the first terminal electrode unit. In this case, an interval between each of the third terminal electrodes 45, 46, 47, 48 and the first terminal electrode 40 is larger than an interval between the first terminal electrode 40 and each of the four second terminal electrodes 41, 42, 43, 44.

According to this embodiment, the first terminal electrode 40 can be used as a ground electrode, and the second terminal electrodes 41, 42, 43, 44 and the third terminal electrodes 45, 46, 47, 48 can be used as signal electrodes.

Sixth Embodiment

Figure 10:
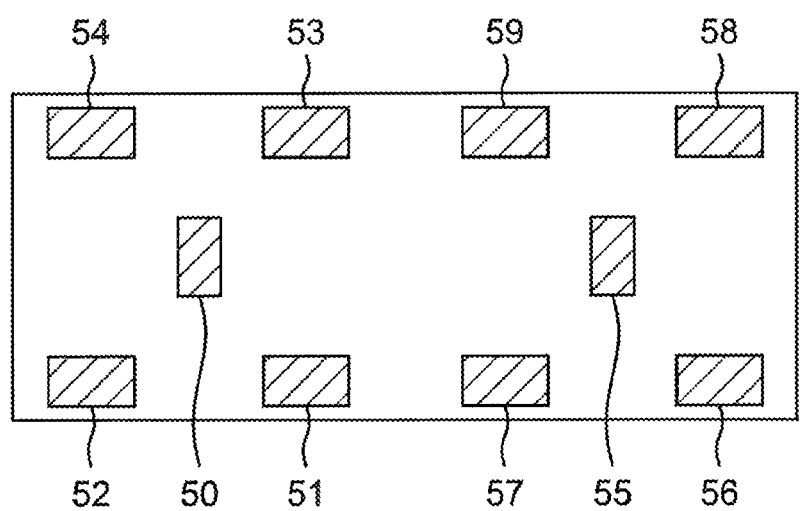
FIG. 10 is a bottom view of a structure of a laminated body according to another embodiment of the present disclosure.
Figure 11:
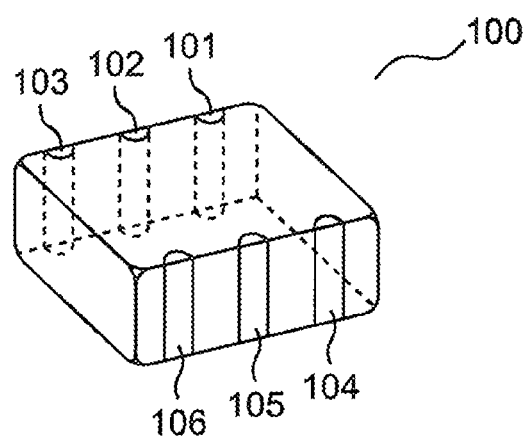
FIG. 11 is a schematic perspective view of an example of a structure of a laminated body constituting a conventional electronic component.
Figure 12:
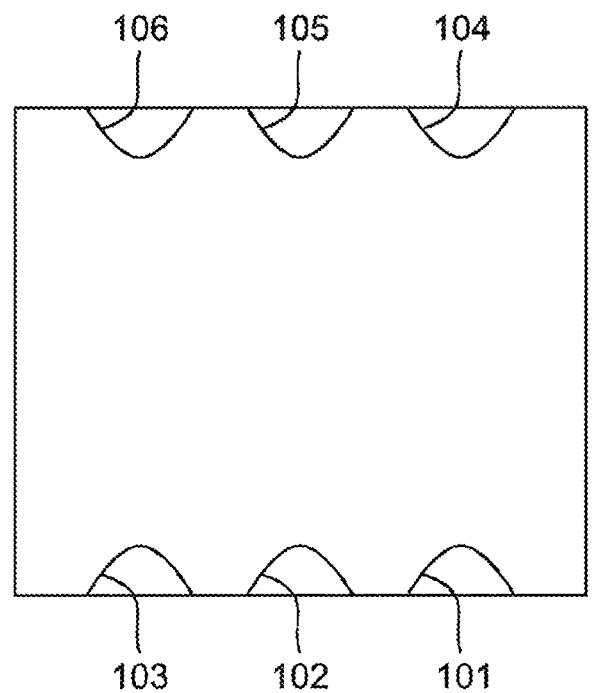
FIG. 12 is a bottom view of the laminated body of FIG. 11.

Although the one first terminal electrode unit is included in the example described in the first embodiment, more terminal electrodes can be used by further increasing the numbers of the insulator layers and the inner conductors. This embodiment includes a plurality of terminal electrode units and includes at least a first terminal electrode unit and a second terminal electrode unit. In this case, the second terminal electrode unit is made up of some or all of the remaining terminal electrodes not constituting the first terminal electrode unit out of the plurality of terminal electrodes, and includes a third terminal electrode and a plurality of fourth terminal electrodes arranged around the third terminal electrode at substantially the same intervals from the third terminal electrode. The second terminal electrode unit may have the same configuration as the first terminal electrode unit. FIG. 10 is a bottom view of a laminated body showing an example of this embodiment, showing an example in which two first terminal electrode units are included. One of the first terminal electrode units is made up of a first terminal electrode 50 and four second terminal electrodes 51, 52, 53, 54. The other first terminal electrode unit corresponds to the second terminal electrode unit and is made up of a third terminal electrode 55 and four fourth terminal electrodes 56, 57, 58, 59.

According to the present embodiment, while 12 terminals are normally required in a conventional electronic component, the number of terminals can be reduced to ten, so that the electronic component can further be miniaturized.

INDUSTRIAL APPLICABILITY

The present disclosure can provide a laminated electronic component capable of achieving miniaturization and a narrower mounting space.

The invention claimed is:

1. An electronic component comprising:
   a laminated body made up of a plurality of laminated insulator layers and having an upper surface and a bottom surface;
   a plurality of inner conductors disposed on the insulator layers in the laminated body; and
   a plurality of terminal electrodes electrically connected to the plurality of inner conductors,
   the plurality of terminal electrodes each being exposed on a bottom surface side of the laminated body,
   some or all of the plurality of terminal electrodes constituting a first terminal electrode unit,
   the first terminal electrode unit including a first terminal electrode and a plurality of second terminal electrodes arranged around the first terminal electrode at substantially the same intervals from the first terminal electrode.

2. The electronic component according to claim 1, wherein
   out of the plurality of terminal electrodes, some or all of the remaining terminal electrodes not constituting the first terminal electrode unit constitute a second terminal electrode unit, and wherein
   the second terminal electrode unit includes a third terminal electrode and a plurality of fourth terminal electrodes arranged around the third terminal electrode at substantially the same intervals from the third terminal electrode.

3. The electronic component according to claim 1, wherein in a planar view of the bottom surface, the first terminal electrode and the plurality of second terminal electrodes each have a polygonal shape, and wherein each of the plurality of second terminal electrodes and the first terminal electrode have sides facing each other and are disposed such that positions minimizing an interval therebetween are located on the facing sides.

4. The electronic component according to claim 1, wherein in a planar view of the bottom surface, the first terminal electrode and the plurality of second terminal electrodes each have a polygonal shape, and wherein at least one corner portion has a round shape among corner portions of the first terminal electrode facing the second terminal electrodes and corner portions of the second terminal electrodes facing the first terminal electrode.

5. The electronic component according to claim 1, wherein a plurality of recesses is formed on the bottom surface of the laminated body, and wherein the terminal electrodes are formed on wall surfaces of the plurality of recesses.

6. The electronic component according to claim 5, wherein
out of the plurality of terminal electrodes, some or all of the remaining terminal electrodes not constituting the first terminal electrode unit constitute a second terminal electrode unit, and wherein
the second terminal electrode unit includes a third terminal electrode and a plurality of fourth terminal electrodes arranged around the third terminal electrode at substantially the same intervals from the third terminal electrode.

7. The electronic component according to claim 1, wherein the plurality of inner conductors constitutes at least two or more elements selected from the group consisting of a coil, a capacitor, and a resistor.

8. The electronic component according to claim 1, wherein the first terminal electrode is a ground terminal electrode.

9. The electronic component according to claim 1, wherein the plurality of second terminal electrodes is arranged at four corners of the bottom surface of the laminated body.

10. The electronic component according to claim 9, wherein the first terminal electrode is disposed at the center of the bottom surface of the laminated body.

11. The electronic component according to claim 10, wherein the first terminal electrode is a ground terminal electrode, and wherein the second terminal electrodes are signal terminal electrodes.

12. The electronic component according to claim 11, wherein
the plurality of inner conductors includes a coil conductor wound on the insulator layers and a capacitor conductor disposed in a plate shape on the insulator layers, and wherein
the signal terminal electrodes are connected to the coil conductor while the ground terminal electrode is connected to the capacitor conductor.

13. The electronic component according to claim 8, wherein the second terminal electrodes arranged at the four corners are formed on wall surfaces of cutout portions formed at the four corners of the bottom surface of the laminated body.

14. The electronic component according to claim 1, wherein the plurality of terminal electrodes are exposed only on the bottom surface of the laminated body.

* * * * *